United States Patent
Varela et al.

(10) Patent No.: US 7,327,805 B2
(45) Date of Patent: Feb. 5, 2008

(54) DEVICE, APPARATUS AND METHOD FOR RECEIVING DATA TRANSMISSIONS HAVING DIFFERENT DATA RATES

(75) Inventors: Julio Fernandez Varela, Columbia, MD (US); David Childress Newman, Baltimore, MD (US); Robert James Conrad, Silver Springs, MD (US)

(73) Assignee: TSI Telsys, Inc., Columbia, MD (US)

( * ) Notice: Subject to any disclaimer, the term of this patent is extended or adjusted under 35 U.S.C. 154(b) by 754 days.

(21) Appl. No.: 10/374,839

(22) Filed: Feb. 26, 2003

(65) Prior Publication Data

US 2003/0161424 A1 Aug. 28, 2003

Related U.S. Application Data

(60) Provisional application No. 60/359,881, filed on Feb. 28, 2002.

(51) Int. Cl.
*H03K 9/00* (2006.01)
*H04L 27/00* (2006.01)

(52) U.S. Cl. .................................................. 375/316
(58) Field of Classification Search ................. 375/316
See application file for complete search history.

(56) References Cited

U.S. PATENT DOCUMENTS

| | | | |
|---|---|---|---|
| 5,420,593 A | 5/1995 | Niles | 342/357 |
| 5,537,121 A | 7/1996 | Lennen | 342/357 |
| 5,663,734 A | 9/1997 | Krasner | 342/357 |
| 5,712,869 A | 1/1998 | Lee et al. | 375/206 |
| 5,721,555 A | 2/1998 | Lennen | 342/357 |
| 5,781,156 A | 7/1998 | Krasner | 342/357 |
| 5,822,362 A * | 10/1998 | Friedmann | 375/130 |
| 5,874,914 A | 2/1999 | Krasner | 342/357 |
| 6,055,280 A | 4/2000 | Genrich | 375/325 |
| 6,108,317 A * | 8/2000 | Jones et al. | 370/320 |
| 6,898,235 B1 * | 5/2005 | Carlin et al. | 375/219 |
| 6,980,608 B2 * | 12/2005 | Yamauchi | 375/342 |
| 7,035,355 B2 * | 4/2006 | Lais et al. | 375/341 |
| 7,073,118 B2 * | 7/2006 | Greenberg et al. | 714/796 |
| 2002/0039904 A1 * | 4/2002 | Anderson | 455/456 |

FOREIGN PATENT DOCUMENTS

GB        2 071 958 A    *    9/1981

* cited by examiner

*Primary Examiner*—David C. Payne
*Assistant Examiner*—Nader Bolourchi
(74) *Attorney, Agent, or Firm*—Cantor Colburn LLP (57) ABSTRACT

A continuously tunable linear phase filter having a ground connection includes a three-terminal Bessel filter having an input terminal for receiving a signal, an output terminal for delivering a signal, a control terminal for receiving a control voltage, and a varactor. Each of the terminals are in signal communication with each other and the varactor is in signal communication with each of the terminals and ground, the varactor being responsive to the control voltage at the control terminal. The capacitance of the varactor is continuously adjustable in response to a change in the control voltage at the control terminal, thereby enabling continuous tuning of the continuously tunable linear phase filter in response to the control voltage.

15 Claims, 13 Drawing Sheets

| Low Data Rate 7th Order Filter | |
|---|---|
| x<br>Data Rate(Mbps) | y<br>Varactor Voltage (Volts) |
| 25.00 | 0.002 |
| 30.00 | 0.002 |
| 35.00 | 0.002 |
| 40.00 | 0.002 |
| 45.00 | 0.18 |
| 50.00 | 0.347 |
| 55.00 | 0.525 |
| 60.00 | 0.736 |
| 65.00 | 1.015 |
| 70.00 | 1.365 |
| 75.00 | 1.655 |
| 80.00 | 1.863 |
| 85.00 | 2.028 |
| 90.00 | 2.164 |
| 95.00 | 2.283 |
| 100.00 | 2.391 |

FIG. 9

| High Data Rate 7th Order Filter | |
|---|---|
| x<br>Data Rate(Mbps) | y<br>Varactor Voltage (Volts) |
| 101 | 0.406 |
| 110 | 0.65 |
| 125 | 1.063 |
| 150 | 1.597 |
| 175 | 1.991 |
| 200 | 2.312 |
| 225 | 2.593 |
| 250 | 2.856 |
| 275 | 3.111 |
| 300 | 3.371 |
| 325 | 3.645 |
| 350 | 3.955 |
| 375 | 4.331 |
| 400 | 4.858 |
| 425 | 5.698 |
| 450 | 6.677 |
| 460 | 7.501 |

FIG. 10

| Low Data Rate 3rd Order Filter | |
|---|---|
| x<br>Data Rate(Mbps) | y<br>Varactor Voltage (Volts) |
| 25 | 0.002 |
| 30 | 0.002 |
| 35 | 0.002 |
| 40 | 0.002 |
| 45 | 0.191 |
| 50 | 0.382 |
| 55 | 0.694 |
| 60 | 1.134 |
| 65 | 1.499 |
| 70 | 1.813 |
| 75 | 2.094 |
| 80 | 2.351 |
| 85 | 2.591 |
| 90 | 2.819 |
| 95 | 3.041 |
| 100 | 3.259 |

*FIG. 11*

| High Data Rate 3rd Order Filter | |
|---|---|
| x<br>Data Rate(Mbps) | y<br>Varactor Voltage (Volts) |
| 101 | 0.497 |
| 110 | 0.697 |
| 125 | 1.004 |
| 150 | 1.459 |
| 175 | 1.863 |
| 200 | 2.235 |
| 225 | 2.582 |
| 250 | 2.911 |
| 275 | 3.23 |
| 300 | 3.544 |
| 325 | 3.858 |
| 350 | 4.179 |
| 375 | 4.515 |
| 400 | 4.898 |
| 425 | 5.328 |
| 450 | 5.957 |
| 459 | 6.636 |

DEVICE, APPARATUS AND METHOD FOR RECEIVING DATA TRANSMISSIONS HAVING DIFFERENT DATA RATES

CROSS REFERENCE TO RELATED APPLICATIONS

This application claims the benefit of U.S. Provisional Application Ser. No. 60/359,881, filed Feb. 28, 2002, which is incorporated by reference in its entirety.

BACKGROUND OF THE INVENTION

The present disclosure relates generally to a device, apparatus and method for receiving data from transmission sources such as satellites, which may be transmitting data using different modulations and different data rates.

Data transmitted from sources such as satellites may be detected by an antenna and processed by several components, such as low noise amplifiers, multi-channel downconverters, separate demodulators and bit synchronizers for each satellite, data matrix switches, and data processing systems, for example. The sources or transmitters transmit data using various modulation techniques such as quadrature phase shift keying (QPSK), staggered quadrature phase shift keying (SQPSK), unbalanced quadrature phase shift keying (UQPSK), and binary phase shift keying (BPSK). Data from various sources may be transmitted at different data rates, such as 66, 150, 240, 300 and 600 Megabits per second (Mbps) for example. Each source transmits the data on a single channel, which is capable of handling a range of data rates. A receiving system must be able to receive data transmitted from different sources at different data rates using different modulation techniques.

In general, an antenna receives transmitted data and amplifies the received data using an internal or external low noise amplifier. The amplified data is then sent to and received by a multichannel downconverter. Based upon the data rate and/or type of modulation, the multichannel downconverter transmits the modulated data to a satellite demodulator located in one of a plurality of equipment racks. The selected satellite demodulator demodulates the modulated data into its I and Q components (channels) for bit synchronization. After bit synchronization, a data matrix switch receives the I and Q components and forwards the I and Q components to a data processing subsystem. The data processing subsystem performs forward error correction decoding, frame synchronization, data quality monitoring, and virtual channel splitting. After the data is processed, the data may be stored in a data storage device for the purpose of data archiving, post processing, or retrieval over an Internet Protocol (IP) from external sources. A station control computer performs the remote monitoring and control for all of the ground station related equipment.

Although prior art systems successfully receive and process data, the systems must have separate demodulators, I channel bit synchronizers, and Q channel bit synchronizers for every different data rate transmitted and received. Since many different components are required by this arrangement, the cost of the receiving system is very high. Accordingly, it is desirable to have an advanced data transmission receiver that overcomes the drawbacks and deficiencies of the prior art.

SUMMARY OF THE INVENTION

In one embodiment, a continuously tunable linear phase filter having a ground connection includes a three-terminal Bessel filter having an input terminal for receiving a signal, an output terminal for delivering a signal, a control terminal for receiving a control voltage, and a varactor. Each terminal is in signal communication with each other, and the varactor is in signal communication with each terminal and ground, the varactor being responsive to a control voltage at the control terminal. The capacitance of the varactor is continuously adjustable in response to a change in the control voltage at the control terminal, thereby enabling continuous tuning of the continuously tunable linear phase filter in response to the control voltage.

In another embodiment, a two-channel bit synchronizer includes an I-channel, a Q-channel, and an S-channel. Each of the I and Q-channels include a post amplifier adapted to receive a signal from a continuously tunable phase filter, a clock and data recovery integrated circuit, a clock reference and a clock synthesizer, and a non-return on zero (NRZ) decoder and driver adapted to receive the data and clock signals and to output NRZ decoded data and clock signals for each of the respective I and Q-channels. The post amplifier is adapted for square or zero crossing detection of the filtered signal, the clock and data recovery integrated circuit is adapted to synchronously recover and provide output in the form of a data signal and a clock signal, and the clock synthesizer is adapted to provide information from the clock reference to the clock and data recovery integrated circuit. The S-channel includes a two-times clock in signal communication with the I-channel, and a data recombination circuit and driver. The two-times clock is adapted to provide a two-times clock signal, and the data recombination circuit and driver is adapted to receive the two-times clock signal. The data recombination circuit and driver is also adapted to receive data signals from the NRZ decoders and drivers of each of the I and Q-channels, and to provide recombined data and clock signals on the S-channel. The two-channel bit synchronizer receives demodulated and filtered signals on each of the I and Q-channels, delivers NRZ decoded data and clock signals on each of the I and Q-channels, and delivers NRZ decoded and recombined data and clock signals on the S-channel.

In a further embodiment, a continuously tunable wideband receiver includes means for receiving signals having different data rates, means for demodulating the received signals having different data rates into I-channel and Q-channel signals, means for filtering the demodulated signals having the different data rates, means for continuously tuning the frequency response of the filtering means in response to the different data rates, and means for recovering data and clock signals from the filtered signals having the different data rates.

In yet another embodiment, an apparatus for receiving data at different data rates from a transmission source, the data being received at an antenna and amplified by a low noise amplifier, includes a single-channel downconverter, a continuously tunable wideband receiver, a data matrix switch, a data processing unit, a data storage device, and a computer adapted to monitor and control the apparatus. The continuously tunable wideband receiver is adapted to receive signals containing data at different data rates, demodulate the received signals into I-channel and Q-channel signals, filter the demodulated signals, continuously tune the frequency response of the filter in response to the different data rates, and recover data and clock signals from the filtered signals, the recovered data signals having the different data rates. The data matrix switch is adapted to select an output channel, such as an I, Q, or S-channel, from the continuously tunable wideband receiver, and the data processing unit is adapted to provide error correction decoding, frame synchronization, data quality monitoring, and virtual channel splitting.

In yet a further embodiment, an apparatus for receiving data at different data rates from a transmission source, the data being received at an antenna, includes means for receiving from the antenna signals carrying the data, means for demodulating the signals to provide baseband data, means for filtering the signals, means for continuously tuning the filtering means in response to the different data rates, means for bit synchronizing the signals to provide I, Q, and S-channel signals, and means for processing the I, Q, and S-channel signals for use by an end user. The received signals are modulated by different modulators and transmitted at different data rates.

In another embodiment, a method for bit synchronizing data at different data rates includes receiving signals at a receiver, demodulating the signals to provide baseband data signals, filtering the signals at a continuously tunable linear phase filter, and bit synchronizing the signals to provide I, Q, and S-channel signals. The data in the signals are at different data rates.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the present invention provides a system for receiving data from transmission sources (transmitters) such as satellites, which may be transmitting data using different modulations and different data rates.

Figure 1:
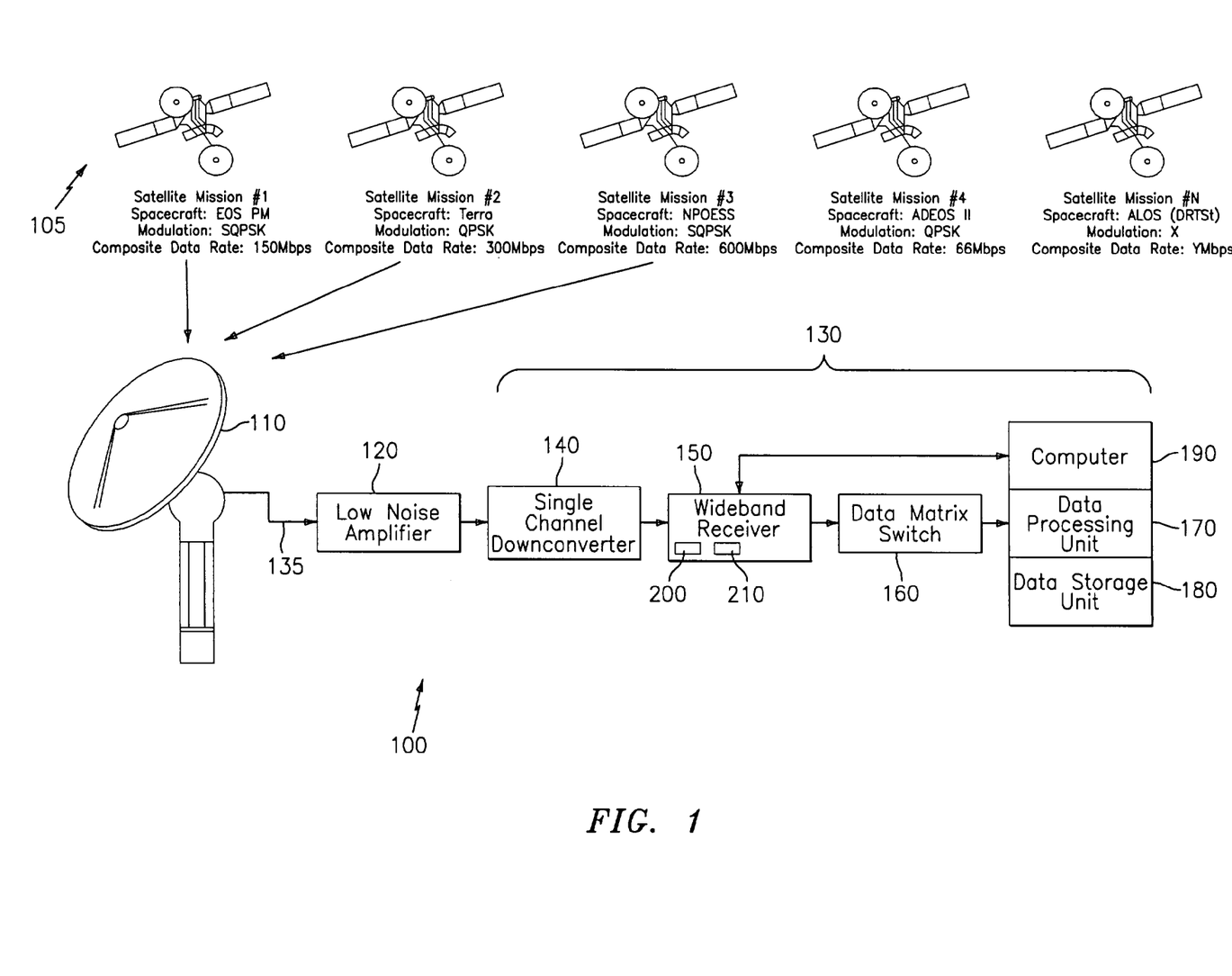
FIG. 1 depicts a block diagram of the data flow in a satellite receiver system in accordance with an embodiment of the invention.

FIG. 1 shows an exemplary receiver system 100 capable of receiving data transmitted at different data rates from a plurality of transmission sources 105 using different modulation techniques. Exemplary modulation techniques include QPSK, SQPSK, UQPSK, BPSK and CW. Receiver system 100 includes an antenna 110 adapted to receive transmitted modulated data and a low noise amplifier 120 adapted to amplify the received data. Low noise amplifier 120 may be internal or external to antenna 110. An apparatus 130 in accordance with an embodiment of the invention is configured to receive data at different data rates from at least one transmission source, as will be discussed in more detail below. Signal path 135 depicts a path of signal communication between the components of FIG. 1.

Apparatus 130 includes a single-channel downconverter (SCD) 140 in signal communication with low noise amplifier 120, a continuously tunable wideband receiver (CTWR) 150 in signal communication with SCD 140, a data matrix switch 160 in signal communication with CTWR 150, a data processing unit 170 in signal communication with data matrix switch 160, a data storage unit 180 adapted to store data from data processing unit 170, and a computer 190 adapted to monitor and control the various components of apparatus 130.

CTWR 150 is adapted to receive signals containing data at different data rates, demodulate the received signals into I-channel and Q-channel signals, filter the demodulated signals at a plurality of continuously tunable linear phase filters (CTLPFs) 440 (to be discussed in more detail below in reference to FIGS. 5-8), continuously tune the frequency response of CTLPFs 440 in response to the different data rates, and recover a plurality of data and clock signals from the filtered signals, the recovered data signals having the different data rates. CTWR 150 outputs synchronous data and clock signals for the I channel, Q channel, and a recombined S-channel to data matrix switch 160. Data matrix switch 160 receives the I, Q, and S-channel signals and forwards selected signals to data processing unit 170. Data processing unit 170 is adapted to perform forward error correction decoding, frame synchronization, data quality monitoring, and virtual channel splitting. After the data is processed, the data may be stored in the data storage unit 180. A station control computer 190 is adapted to perform the remote monitoring and control for all of the ground station related equipment of apparatus 130.

Figure 2:
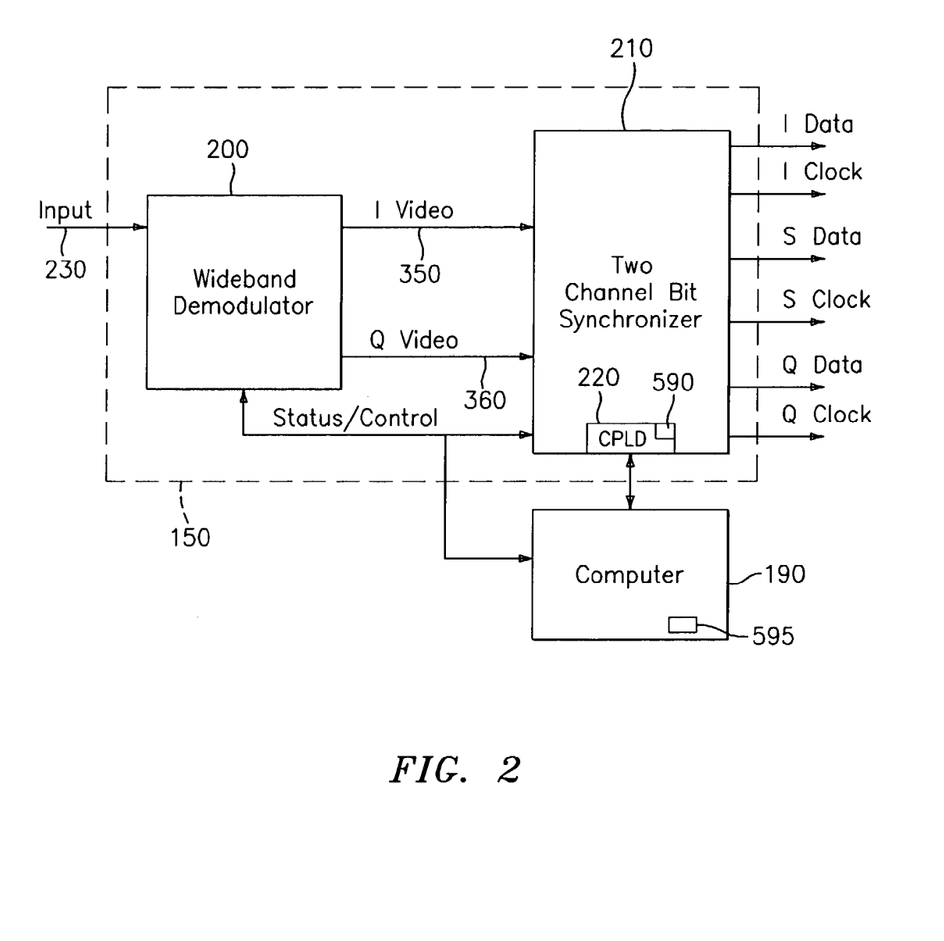
FIG. 2 depicts a block diagram of a wideband receiver in accordance with an embodiment of the invention.

FIG. 2 depicts an exemplary block diagram of CTWR 150. CTWR 150 is a continuously tunable data receiver that preferably supports QPSK, SQPSK, UQPSK, BPSK, and CW modulation with data rates preferably from 25 Mbps to 500 Mbps on a single channel for a composite data rate of preferably 50 Mbps to 1 Gbps (gigabits per second). Continuously tunable is defined as the receiver's ability to tune over the operating data rate range with a predefined resolution, such as about one hertz (Hz) resolution for example. CTWR 150 includes a single wideband demodulator 200 and a two-channel bit synchronizer (TCBS) 210. Wideband demodulator 200 receives the modulated signal from single channel downconverter 140 and demodulates the signal into I-channel and Q-channel baseband components. TCBS 210 includes CTLPFs 440, an arrangement for providing continuous tuning of CTLPFs 440, an arrangement for recovering data and clock signals from the filtered signals, and an arrangement for generating a plurality of recombined S-channel signals, which are discussed in more detail below in reference to FIGS. 5 and 6. Computer 190 communicates with both wideband demodulator 200 and two channel bit synchronizer 210. Computer 190 provides the remote interface for configuring demodulator 200 and bit synchronizer 210 to support the desired modulation scheme and data rate. Wideband demodulator 200 provides coherent tracking and demodulation of the input modulated signal and provides the recovered baseband data (e.g. video) to two-channel bit synchronizer 210. Two-channel bit synchronizer 210 includes a control programmable logic device (CPLD) 220, which may be a field programmable gate array for example. In an embodiment, CPLD 220 is the status and control device for all of the functions of demodulator 200 and bit synchronizer 210.

Figure 3:
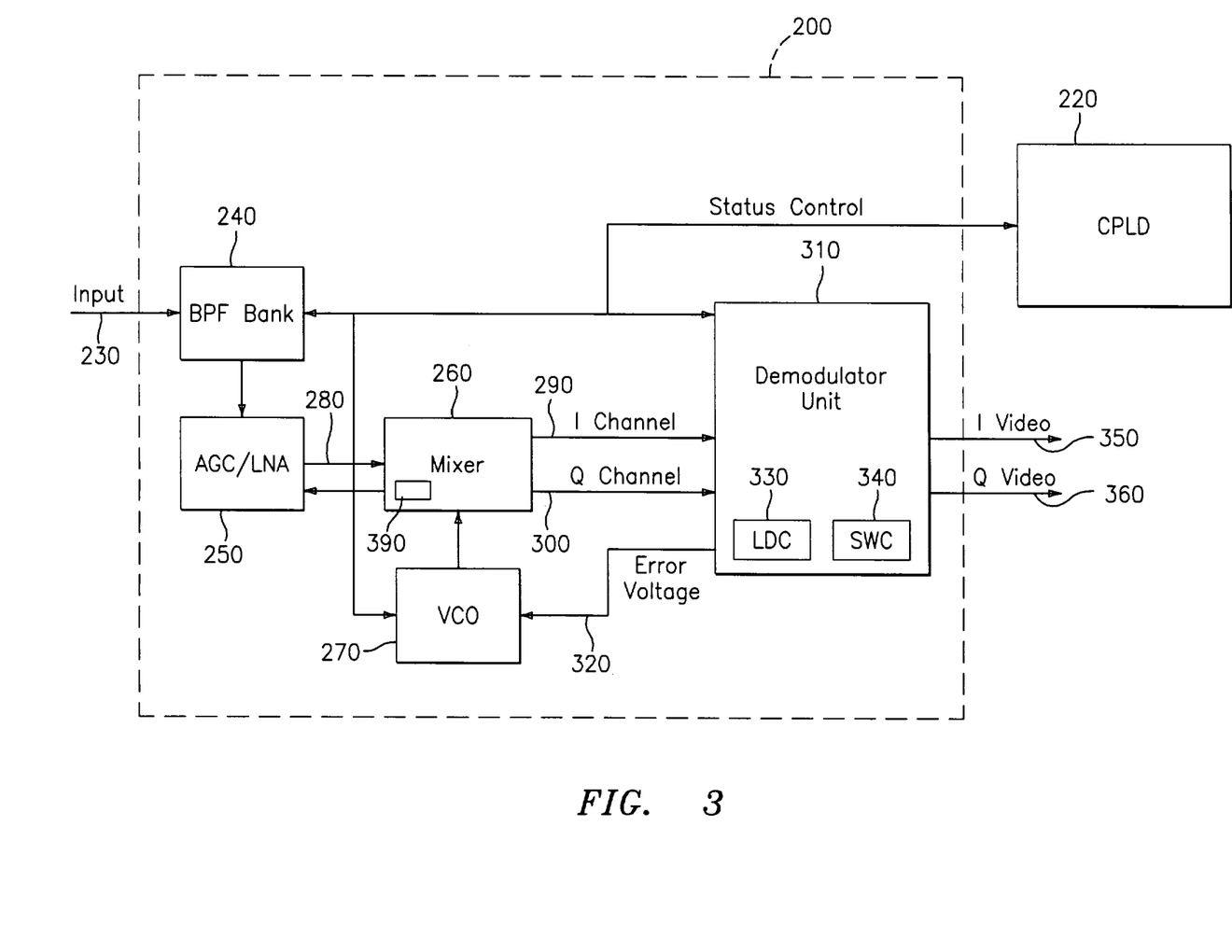
FIG. 3 depicts a block diagram of a wideband demodulator in accordance with an embodiment of the invention.

FIG. 3 is a more detailed exemplary block diagram of wideband demodulator 200. The input modulated data 230 passes through a band pass filter bank (BPFB) 240 to remove extraneous noise. The appropriate filter of BPFB 240 is selected based on the data rate of the modulated data to optimize the noise bandwidth subject to automatic gain control (AGC) 250. The filtered modulated data is amplified by automatic gain control and low noise amplifier (AGC/LNA) unit 250, which provides a constant power level. Dual mixers 260 provides the quadrature mixing of a coherent local oscillator frequency supplied by the voltage controlled oscillator (VCO) 270 with the incoming modulated data 280. The mixers 260 output the data on I and Q channels 290, 300 to a demodulator unit 310, which provides the tracking and lock detection functions of wideband receiver 150.

Demodulator unit 310 produces an error voltage 320 that is proportional to two times the phase error between the VCO output frequency and the incoming suppressed carrier frequency. The error voltage 320 drives VCO 270 to track the incoming modulated data-signal 280. At a loss of signal (LOS), a lock detection circuit 330 enables a sweep circuit 340 for reacquisition of the input signal. Lock detection circuit 330 enables detection versus a threshold for all of the operational modulation formats. In an embodiment, lock detection circuit 330 is defined by the following expression:

$$y(t)=(2 \cdot I(t) \cdot Q(t))^2 - (I^2(t) - Q^2(t))^2 \qquad \text{Equa. 1}$$

Once wideband demodulator 200 is locked to the input modulated signal 230, the baseband video is generated in the I and Q channels 350, 360 for bit synchronization. In an embodiment, both sweep circuit 340 and lock detection circuit 330 are part of demodulation unit 310.

Figure 4A:
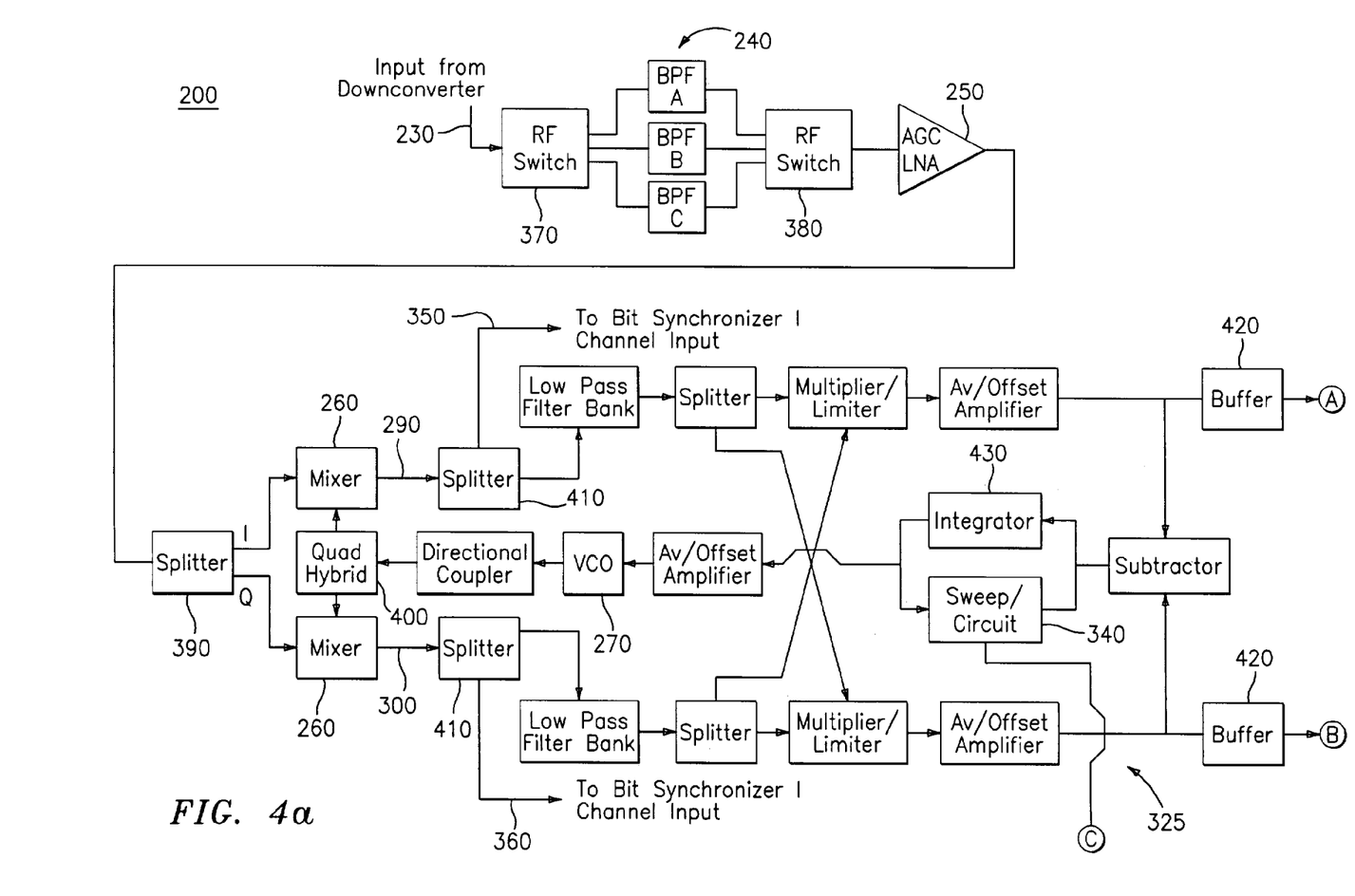
FIG. 4 depicts a more detailed block diagram of the exemplary wideband demodulator of FIG. 3.
Figure 4B:
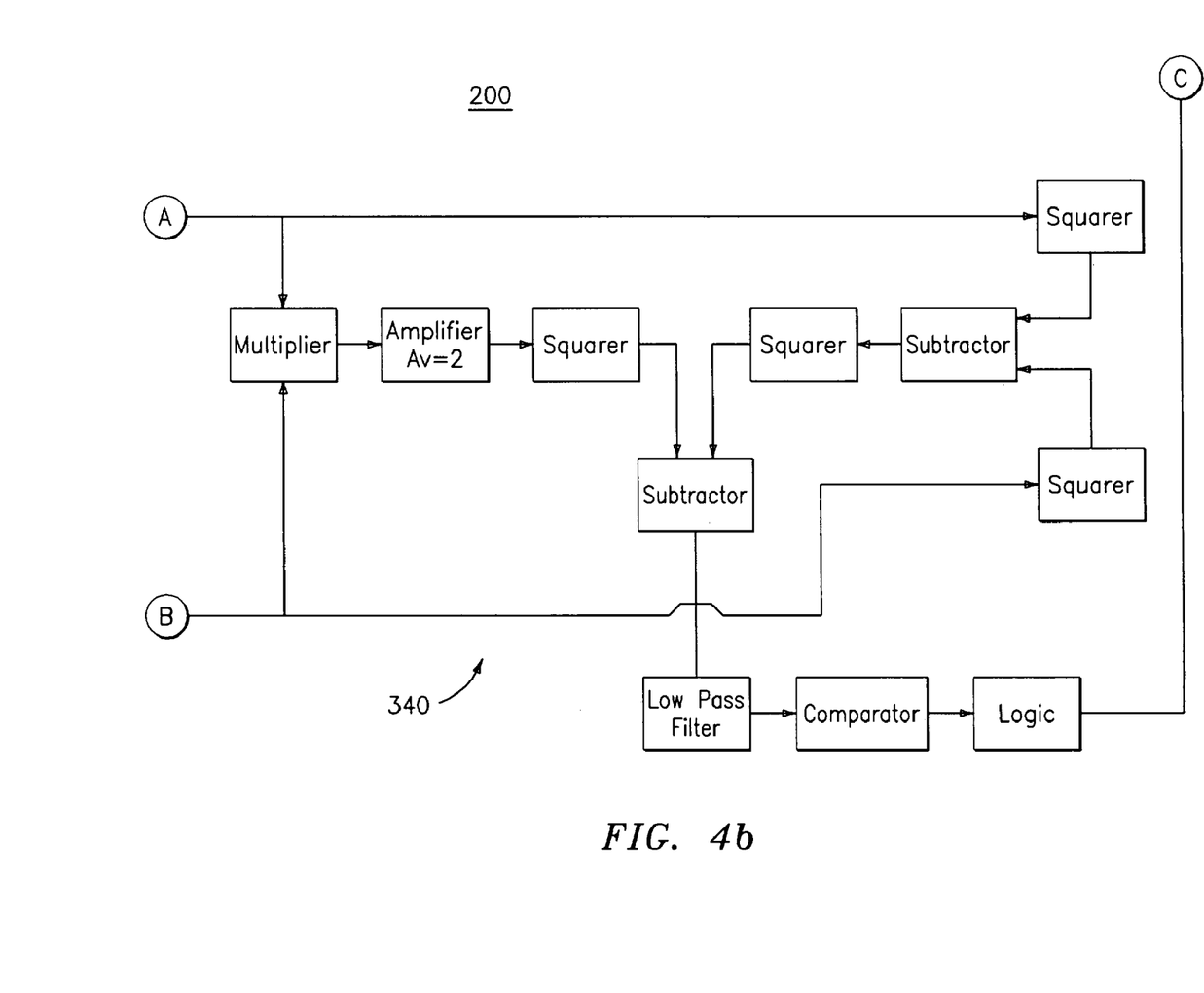

FIG. 4 is a more detailed exemplary block diagram of wideband demodulator 200. As depicted in FIG. 4, an RF switch 370 directs the input modulated data signal 230 to the correct bandpass filter (BPF/A, BPF/B, BPF/C) in the bandpass filter bank 240 based on the data rate of the modulated data. A second RF switch 380 provides the appropriate connection between BPFB 240 and AGC/LNA 250, which amplifies the filtered modulated data. A phase lock loop 325, such as the modified Costas Loop shown in FIG. 4 for example, locks wideband demodulator 200 to the input modulated data signal 230. After the AGC/LNA stage, the modulated input signal is split at signal splitter 390 into the I and Q channels 290, 300. A quadrature hybrid 400 provides the quadrature relationship between the I and Q channel mixers 260. Quadrature hybrid 400 is driven by VCO 270, (1.2 Ghz (gigahertz) VCO for example). When demodulator 200 obtains coherent phase lock to the incoming modulated signal, the unsynchronized data (video for example) is present at the output 290, 300 of the mixers 260. After mixers 260, the data signal is split at signal splitters 410 and fed to the I-channel and Q-channel 350, 360 of bit synchronizer 210, and to the remaining modified Costas Loop circuitry 325 to provide the error voltage to VCO 270 for the purpose of tracking and signal acquisition. The output of the I and Q channel buffers 420 feed the input of lock detection circuit 330, which controls the sweeping and acquisition function of demodulator 200. In a locked state, an integrator 430 is switched into the loop providing the frequency and phase tracking of the input signal. In a loss of signal condition, a sweep circuit 340 is switched in steering VCO 270 to reacquire the input modulated signal.

Figure 5:
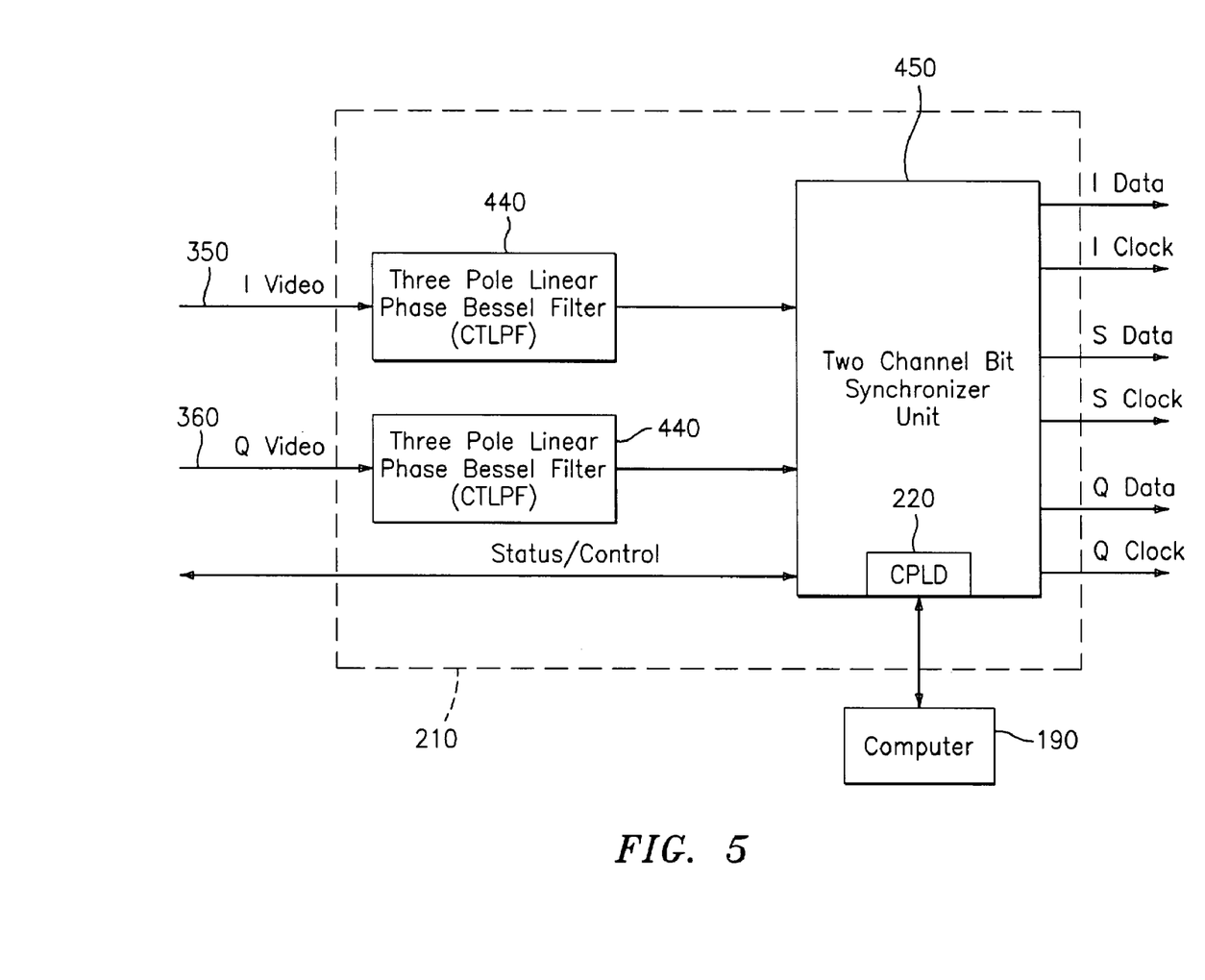
FIG. 5 depicts a block diagram of a two-channel bit synchronizer in accordance with an embodiment of the invention.

FIG. 5 depicts an exemplary block diagram of two-channel bit synchronizer 210, which synchronously recovers the data and clock from the baseband data (I and Q-channel video 350, 360 for example) received from wideband demodulator 200. TCBS 210 includes CTLPFs 440 and a two-channel bit synchronizer unit (TCBS unit) 450. In an embodiment, CTLPFs 440 are three-pole (alternatively three-terminal) Bessel filters.

Figure 6A:
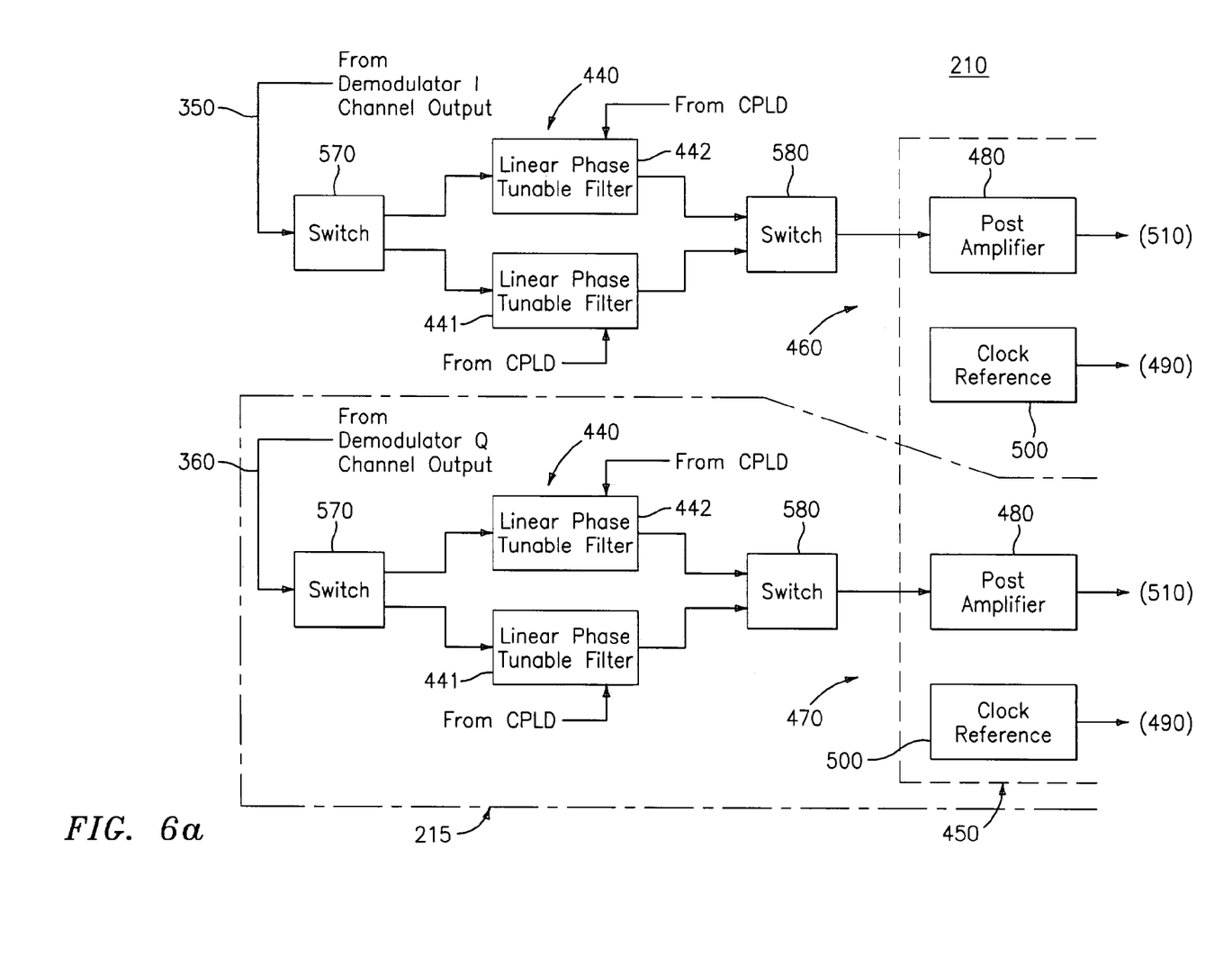
FIG. 6 depicts a more detailed block diagram of the exemplary two-channel bit synchronizer of FIG. 5.
Figure 6B:
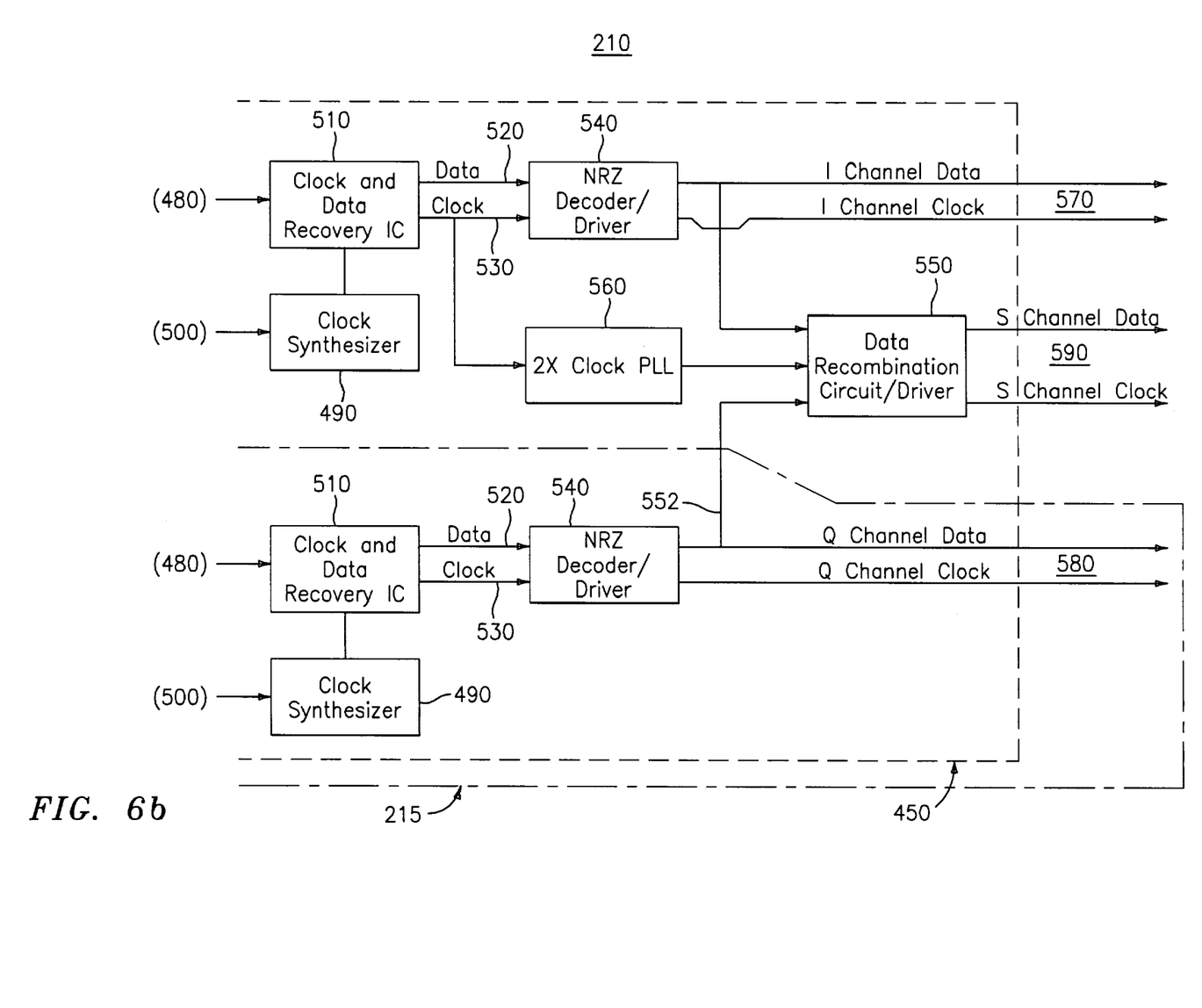

Referring now to FIG. 6, a detailed exemplary block diagram of two-channel bit synchronizer 210 is depicted. As depicted, TCBS unit 450 consists of two independent I and Q-channels 460, 470 used to recover the data and clock from the filtered baseband video. Post Amplifiers 480 at the input of TCBS unit 450 are used to square or zero-crossing-detect the filtered baseband data. Independent clock synthesizers 490 are used to provide a reference to the data and clock recovery integrated circuits 510. Reference clocks 500 provide the stable reference to the clock synthesizers 490. An exemplary data and clock recovery integrated circuit 510 is the device designated by catalog number SY87701L from Micrel, Inc. After the data and clock signals 520, 530 are synchronously recovered, the data is NRZ (non-return to zero) decoded at NRZ decoder/driver 540. In an exemplary receiver system 100 receiving a data signal in SQPSK modulation format, the I and Q-channel data signals are recombined in data recombination circuit/driver 550 in SQPSK format. The two times clock 560 is generated from phase lock loop (PLL) 325 and derived from the I channel clock signal 530. In the exemplary SQPSK recombiner 550, the recombiner circuit preferably enables ¼ bit or ½ bit data delay. The synchronous I-channel data and clock 570, Q-channel data and clock 580, and S-channel data and clock 590 are available at the output of TCBS unit 450 through the output driver circuits 540, 550.

In each of I and Q-channel 460, 470 and ahead of post amplifiers 480, an embodiment has a first switch 570, a plurality of CTLPFs 440, designated separately as 441, 442, and a second switch 580. The separate CTLPFs 441, 442, discussed in greater detail below in reference to FIGS. 7 and 8, enable continuous tuning over the entire desired data rate tuning range, from about 10 Mega-Hertz (MHz) to about 450 MHz for example. While only two CTLPFs 441, 442 per channel 460, 470 are depicted in FIG. 6, an artisan skilled in the art will appreciate that additional CTLPFs 440 may be employed for a different desired data rate tuning range. In an embodiment, CTLPF 441 enables continuous tuning over the data rate tuning range from about 10 MHz to about 90 MHz, as discussed below in reference to FIG. 7, and CTLPF 442 enables continuous tuning over the date rate tuning range from about 90 MHz to about 450 MHz, as discussed below in reference to FIG. 8. First switch 570 is adapted to receive demodulated signals from wideband demodulator 200, each first switch 570 receiving the respective signal 350, 360 from the I and Q-channels, and to direct the demodulated signals to one of CTLPFs 441, 442 depending on the data rate received. Second switch 580 is adapted to receive the filtered signals from the respective CTLPF 441, 442 and to direct the filtered signals to the appropriate post amplifier 480.

Figure 7:
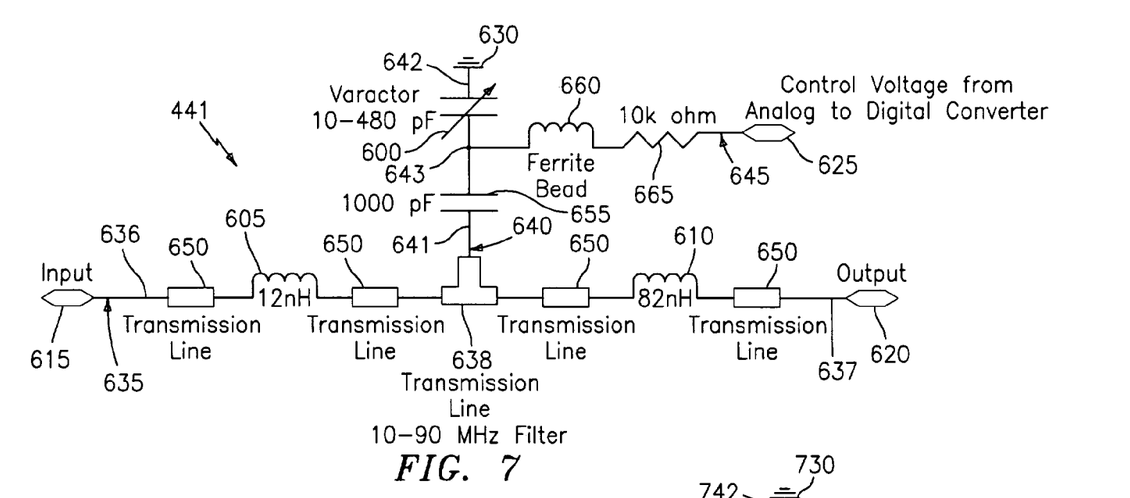
FIGS. 7-8 depict exemplary electrical circuit diagrams of continuously tunable linear phase filters in accordance with an embodiment of the invention.
Figure 8:
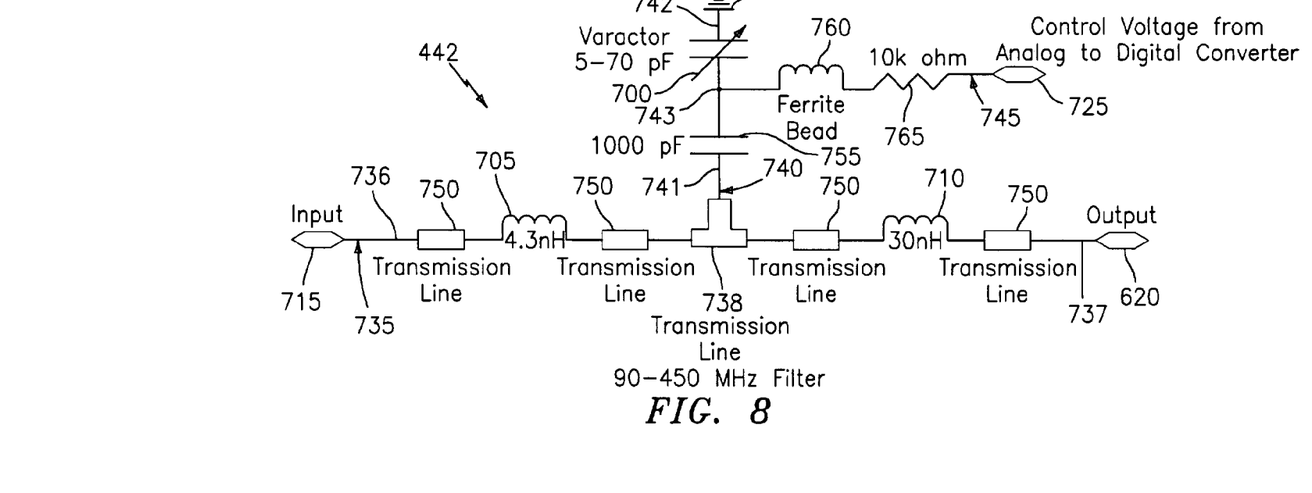
Figure 9:
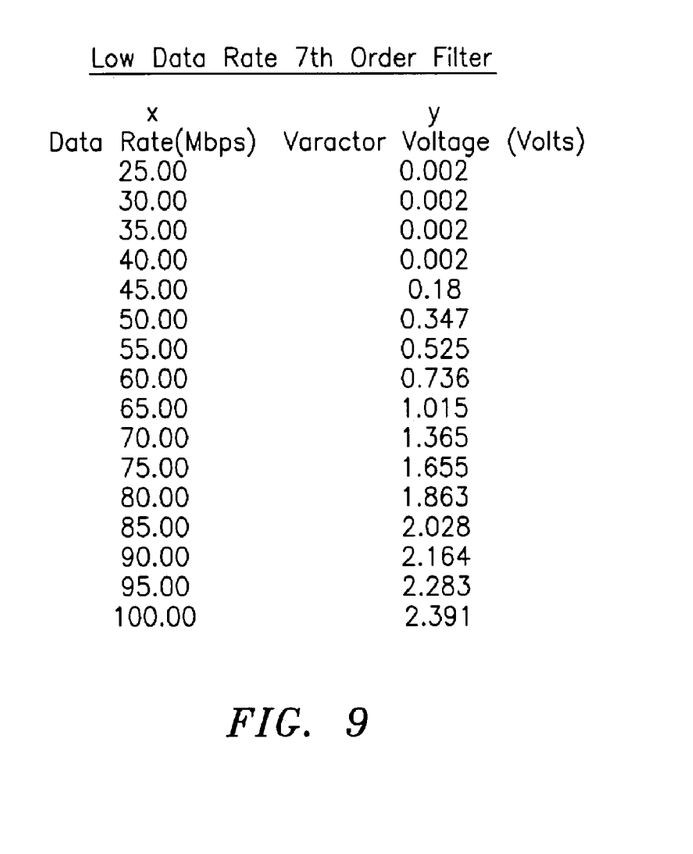
FIGS. 9-12 depict the contents of exemplary lookup tables in accordance with alternative embodiments of the invention.
Figure 10:
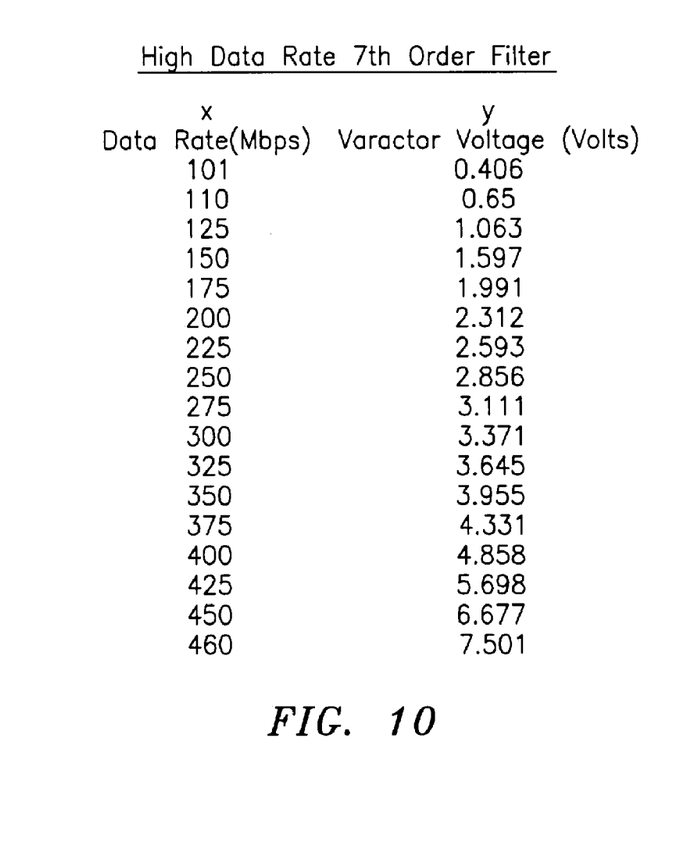
Figure 11:
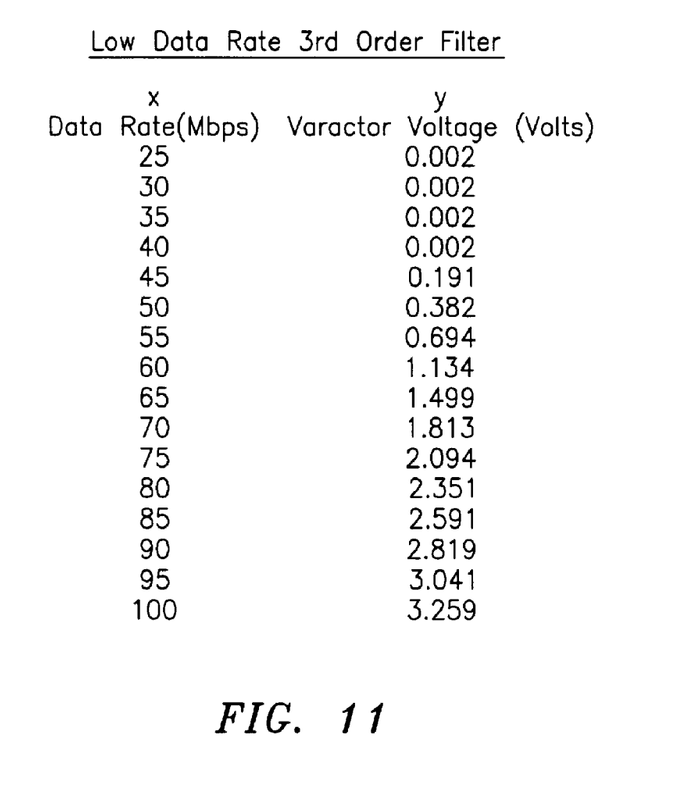
Figure 12:
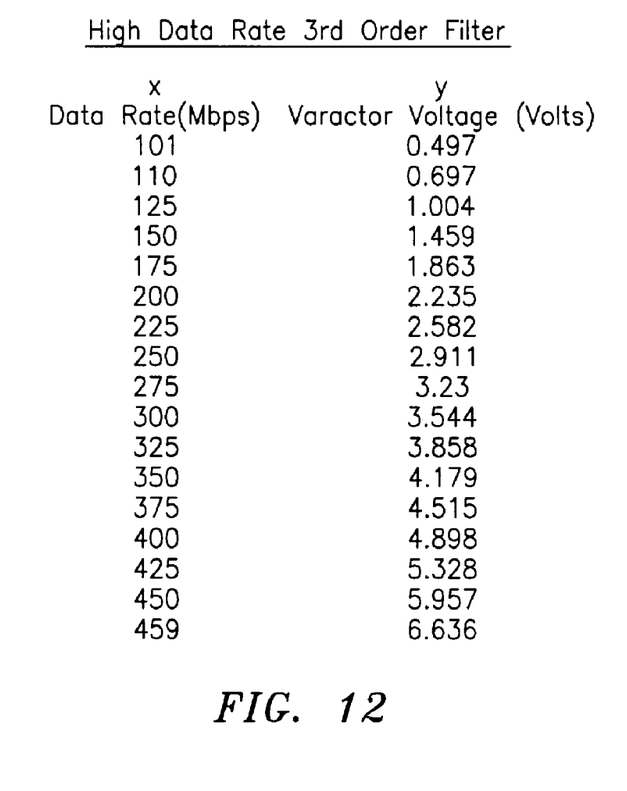

Referring now to FIGS. 7 and 8, exemplary electrical circuit diagrams of continuously tunable linear phase filters 441, 442 (generally referred to as 440) are depicted. As discussed above, CTLPFs 440 limit the baseband data to its fundamental frequency components. FIG. 7 depicts a CTLPF having a frequency range from about 10 MHz to about 90 MHz, and FIG. 11 depicts a CTLPF having a frequency range from about 90 MHz to about 450 Mhz. While specific frequency response ranges are depicted in the CTLPFs of FIGS. 7 and 8 and discussed herein, the artisan will appreciate that these ranges are exemplary only and that other ranges may be employed. CTLPFs 441, 442 are comprised of a combination of voltage tunable components, such as field effect transistors (FETS) and varactor diodes 600, 700, and fixed components (discussed in more detail below), such as inductors, capacitors, ferrite beads, resistors, and transmission lines, for example. The CTLPFs 441, 442 enable filter cutoff frequency tuning while maintaining filter response. An embodiment employs a varactor diode 600, 700 with two fixed inductors 605, 610, and 705, 710, respectively, to form a three-pole (alternatively three-terminal) Bessel filter for each filter bank 441, 442. Varactor 600, 700 is controlled by a digital to analog (D/A) converter 590 (a 10-bit digital to analog converter, for example) at CPLD 220. A digital word sent from CPLD 220 is converted to a voltage at D/A 590 that translates to a voltage controlled capacitance at varactor 600, 700, which ultimately translates to a corner frequency for the filter bank 441, 442.

In an embodiment, a memory 595 at computer 190 includes a lookup table of predefined x-y data points providing a one-to-one relationship between the known transmission signal data rate input (x) and the desired voltage level output (y) for controlling varactor 600, 700. In another embodiment, memory 595 includes a function having an input/output relationship defined in accordance with the following equation:

$$y=a0+a1x+a2x^2+a3x^3+a4x^4+a5x^5+a6x^6+a7x^7,  \quad \text{Equa. 2}$$

Equation 2 is a 7th order function, where in an exemplary embodiment,

|       | Low Frequency Filter (Ref. to FIG. 7) | High Frequency Filter (Ref. to FIG. 8) |
|-------|---------------------------------------|----------------------------------------|
| a0 =  | −0.0016                               | 0.0000                                 |
| a1 =  | 0.0282                                | −0.0014                                |
| a2 =  | −0.1919                               | 0.0185                                 |
| a3 =  | 0.6030                                | −0.1177                                |
| a4 =  | −0.8122                               | 0.3734                                 |
| a5 =  | 0.2082                                | −0.5530                                |
| a6 =  | 0.6489                                | 0.6809                                 |
| a7 =  | 2.9949                                | 4.4079                                 |

In an alternative embodiment, the 3rd order function of Equation 3 below may be substituted for Equation 2.

$$y=b0+b1x+b2x^2+b3x^3, \quad \text{Equa. 3}$$

where in an exemplary embodiment,

|       | Low Frequency Filter (Ref. to FIG. 7) | High Frequency Filter (Ref. to FIG. 8) |
|-------|---------------------------------------|----------------------------------------|
| b0 =  | −0.0109                               | −0.0019                                |
| b1 =  | 0.0542                                | −0.0155                                |
| b2 =  | 0.3139                                | 0.4476                                 |
| b3 =  | 3.0561                                | 4.3971                                 |

The x-y values of the lookup table in memory 595 relate to the x-y values of the function of Equation 2, and alternatively to the x-y values of the function of Equation 3. FIGS. 9-12 depict selected data point entries of the respective look up tables, where FIGS. 9-10 correspond to Equation 2, and FIGS. 11-12 correspond to Equation 3. While only selected data point entries are depicted in FIGS. 9-12, the artisan will appreciate that a finer resolution of data point entries is readily obtainable through testing or calculation.

In general, the various transmission data rates for the various transmission sources are known, and the unknown for controlling CTLPFs 441, 442 is the desired control voltage input to varactors 600, 700. Since CTLPFs 441, 442 are configured for signal compatibility with a specific bit synchronizer unit 450, and more specifically for signal compatibility with a specific clock and data recover integrated circuit 510, it will be appreciated that Equations 2 and 3 are exemplary only, and that any 3rd order or higher equation of the general form $$y=a+bx+cx^2+ \ldots +nx^m \quad \text{Equa. 4}$$

may be employed, where a, b, c, and n represent derived coefficients and m represents powers of x greater than 2. The appropriate equation or lookup table for a specific combination of CTLPF 440 and TCBS unit 450 may be obtained through standard network analysis and circuit simulation techniques.

A more general description defining the function of Equations 2-4 is provided by $$(\text{control voltage level})=f(\text{known data rate}), \quad \text{Equa. 5}$$

where f represents a predefined function, as discussed above, defining the control voltage level output as a function of the known data rate input.

In an embodiment, each CTLPF 441, 442 is a three-terminal Bessel filter having an input terminal 615, 715, an output terminal 620, 720, and a control terminal 625, 725, each of the terminals being in signal communication with each other for each respective set of terminals. As discussed herein with reference to CTLPFs 441, 442, numerals 6xy and 7xy having the same values for xy relate to similar elements of the respective CTLPFs 441, 442. Varactor 600, 700 is in signal communication with each respective set of terminals and ground 630, 730. As discussed above, the capacitance (and more generally impedance) of varactor 600, 700 is responsive to the control voltage presented at control lead 625, 725, thereby enabling continuous tuning of CTLPFs 441, 442 in response to the control voltage, and more specifically in response to the known data rate of the transmitted signal from the plurality of transmission sources 105. Computer 190, being in signal communication with wideband demodulator 200, reads the data rates being transmitted on input modulated data signal 230, reads memory 595 for the desired control voltage level, as discussed above, and then communicates with CPLD 220 for setting the desired control voltage at control terminal 625, 725. Computer 190 may be preprogrammed to read a specific available data rate, or may be controlled by a user for tuning into a desired data rate from a specific transmission source 105.

A first signal path 635, 735 is arranged between input terminals 615, 715 and output terminals 620, 720, and includes a first path portion 636, 736, a second path portion 637, 737, and a three-terminal transmission line 638, 738 defining a first interposed communication point. A second signal path 640, 740 is arranged between transmission line 638, 738 and ground 630, 730, and includes a third path portion 641, 741, a fourth path portion 642, 742, and a second interposed communication point 643, 743, varactor 600, 700 being arranged in fourth path portion 642, 742. A third signal path 645, 745 is arranged between second interposed communication point 643, 743 and control terminal 625, 725.

First path portion 635, 735 includes an inductor 605, 705 and two two-terminal transmission lines 650, 750, one being arranged on each side of inductor 605, 705. Transmission lines 650, 750 have an impedance of about 50 ohms (for example, 50 ohms +/− about 10%). Second path portion 637, 737 includes an inductor 610, 710 and two two-terminal transmission lines 650, 750, one being arranged on each side of inductor 610, 710. Three-terminal transmission line 638, 738 has a similar impedance as the two-terminal transmission lines. Third path portion 641, 741 includes a capacitor 655, 755. Third signal path 645, 745 includes a ferrite bead 660, 760 and a resistor 665, 765. Ferrite bead 660, 760 acts like an inductor at a predefined low frequency range and like a resistor at a predefined high frequency range.

In an embodiment of CTLPF 441, inductor 605 has an inductance of about 12 nano-henries (nH) (for example, about 12 nH +/− about 5%), inductor 610 has an inductance of about 82 nH (about 82 nH +/− about 5% for example), capacitor 655 has a capacitance of about 1000 pico-Farads (pF) (for example, about 1000 pF +/− about 10%), ferrite bead 660 has an impedance of equal to or greater than about 200 ohms at the high frequency range, resistor 665 has a resistance of about 10 kilo-ohms (kohms) (about 10 kohms +/− about 5% for example), and varactor 600 has a variable capacitance from about 10 pF to about 480 pF.

In an embodiment of CTLPF 442, inductor 705 has an inductance of about 4.3 nano-henries (nH) (for example, about 4.3 nH +/− about 5%), inductor 710 has an inductance of about 30 nH (about 30 nH +/− about 5% for example), capacitor 755 has a capacitance of about 1000 pico-Farads (pF) (for example, about 1000 pF +/− about 10%), ferrite bead 760 has an impedance of equal to or greater than about 200 ohms at the high frequency range, resistor 765 has a resistance of about 10 kilo-ohms (kohms) (about 10 kohms +/− about 5% for example), and varactor 700 has a variable capacitance from about 5 pF to about 70 pF.

Figure 13:
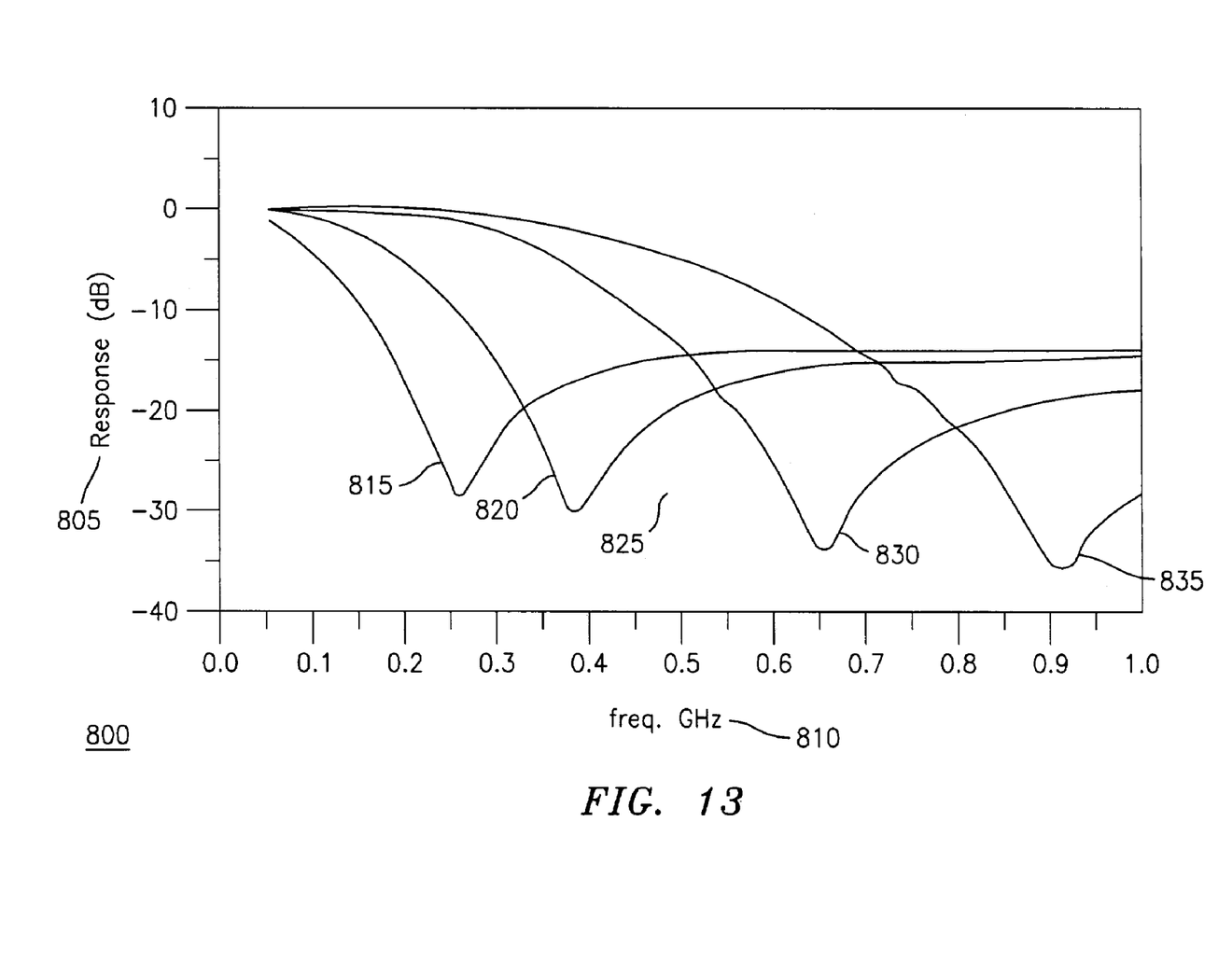
FIGS. 13-14 depict frequency response graphs of the exemplary continuously tunable linear phase filter of FIG. 8.
Figure 14:
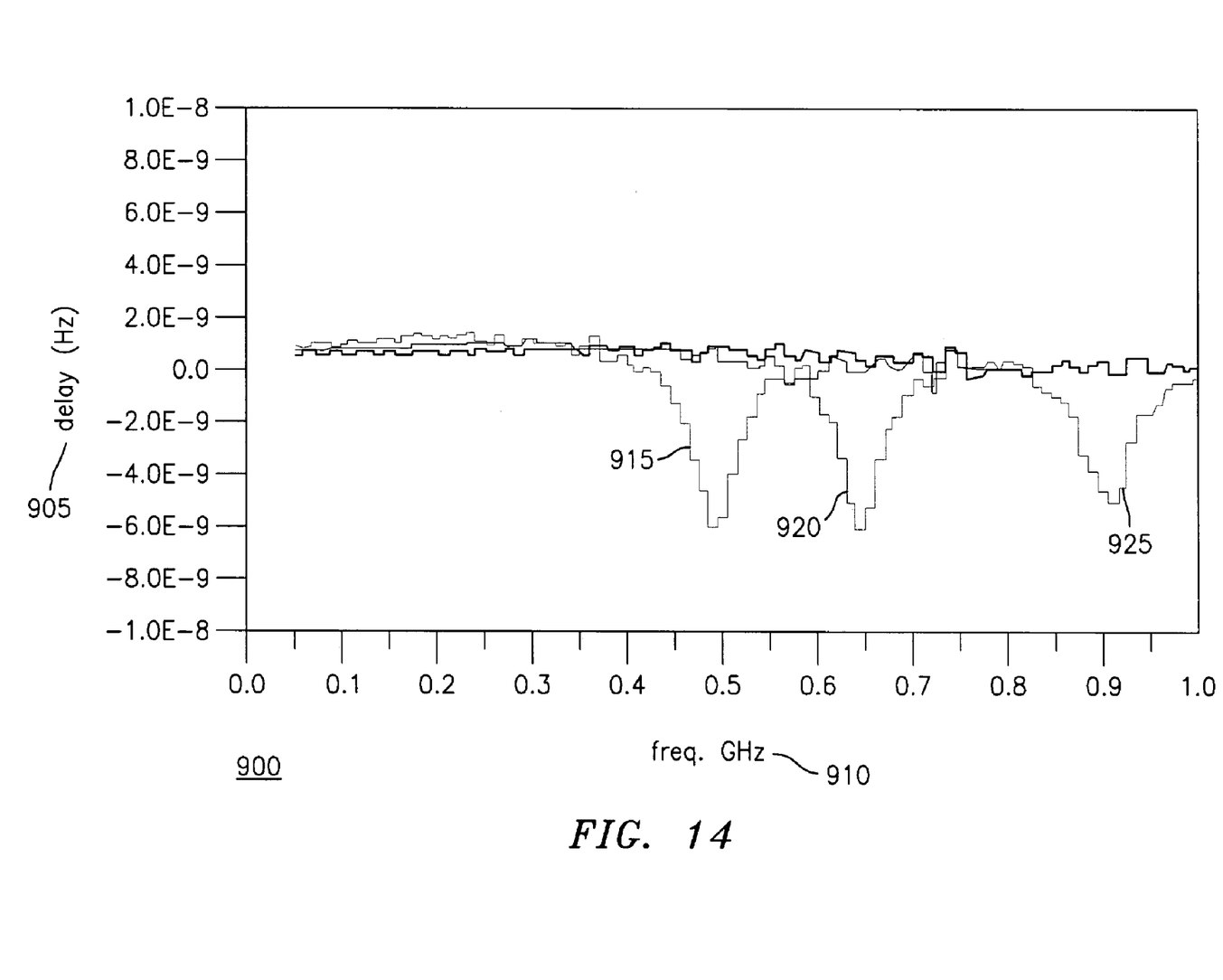

FIG. 13 depicts a graph 800 showing the change in frequency roll off response in decibels (dB) 805 as a function of sweep frequency input in gigahertz (freq, GHz) 810 for CTLPF 442 of FIG. 8 with a 0-volt (815), 2-volt (820), 3-volt (825), 6-volt (830), and 9-volt (835) stimulus applied to varactor 700. FIG. 14 depicts a graph 900 showing that CTLPF 442 of FIG. 8 maintains a linear group delay (Hz) 905, or phase versus frequency response, as a function of sweep frequency input (freq, GHz) 910 within the pass band with a change in varactor tuning voltage for 3-volt (915), 6-volt (920), and 9-volt (925) stimulus.

In an alternative embodiment, elements of TCBS 210 may be configured as a single-channel bit synchronizer (SCBS) 215 having all the elements of one channel of TCBS 210 with the exception of signal communication path 552, thereby providing a SCBS 215 having a CTLPF 440, and a bit synchronizer module (as depicted by the elements of 450 contained within the dot-dash boundary defining 215 shown in FIG. 6).

In concert with the above discussion, an embodiment for bit synchronizing data at different data rates includes the steps of receiving a plurality of signals at a receiver 150, demodulating the signals at a demodulator 200 to provide baseband data signals, filtering the signals at a CTLPF 440, and bit synchronizing the signals at a bit synchronizer 210 to provide I, Q, and S-channel signals. Filtering the signals at a CTLPF 440 includes the steps of acquiring a tabulated control voltage level from a lookup table in a memory or acquiring a calculated control voltage level from a function in the memory, providing a control voltage to the CTLPF 440 in response to the control voltage level, and tuning the frequency response of the CTLPF 440 in response to the control voltage. Tuning the frequency response of the CTLPF 440 includes the step of adjusting the capacitance, or more generally impedance, of the CTLPF 440 at a varactor 600, 700.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A continuously tunable wideband receiver, comprising:
   means for receiving signals having different data rates;
   means for demodulating said received signals having different data rates into at least one of I-channel and Q-channel signals;
   means for filtering said demodulated signals having said different data rates;
   means for continuously tuning the frequency response of said filtering means in response to said different data rates; and
   means for recovering data and clock signals from said filtered signals having said different data rates;
   wherein said means for continuously tuning comprises for each of said I and Q channels a first means for continuously tuning over a first tuning range, and a second means for continuously tuning over a second tuning range different from the first tuning range.

2. The continuously tunable wideband receiver of claim 1, further comprising:
   means for recombining said filtered I and Q-channel signals to provide S-channel signals having data and clock signals at said different data rates.

3. The continuously tunable wideband receiver of claim 1, wherein said means for continuously tuning the frequency response of said filtering means further comprises:
   means for providing a control voltage responsive to said different data rates to said filtering means.

4. The continuously tunable wideband receiver of claim 3, wherein said means for providing a control voltage further comprises:
   means for acquiring at least one of a tabulated control voltage level and a calculated control voltage level for establishing said control voltage.

5. An apparatus for receiving data at different data rates from at least one transmission source, the data being received at an antenna and amplified at a low noise amplifier, comprising:
   a single-channel downconverter in signal communication with said low noise amplifier;

a continuously tunable wideband receiver in signal communication with said downconverter, said continuously tunable wideband receiver adapted to receive signals containing said data at different data rates, demodulate said received signals into at least one of I-channel and Q-channel signals, filter said demodulated signals at a filter, continuously tune the frequency response of said filter in response to said different data rates, and recover a plurality of data and clock signals from said filtered signals, said recovered data signals having said different data rates;

said continuously tunable wideband receiver further comprising for each of said I and Q channels a first means for continuously tuning over a first tuning range, and a second means for continuously tuning over a second tuning range different from the first tuning range;

a data matrix switch in signal communication with said continuously tunable wideband receiver adapted to select an output channel from said continuously tunable wideband receiver, said output channel including at least one of an I-channel, a Q-channel, and an S-channel;

a data processing unit in signal communication with said data matrix switch adapted to provide error correction decoding, frame synchronization, data quality monitoring, and virtual channel splitting;

a data storage device adapted to store data from said data processing unit; and a computer adapted to monitor and control said apparatus.

6. The apparatus of claim 5, wherein said continuously tunable wideband receiver, comprises:

means for acquiring at least one of a tabulated control voltage level and a calculated control voltage level in response to said different data rates;

means for providing a control voltage in response to said control voltage level; and means for continuously tuning the frequency response of said filter in response to said control voltage.

7. The apparatus of claim 6, wherein said means for continuously tuning the frequency response of said filter comprises means for continuously adjusting the impedance of said filter.

8. The apparatus of claim 7, wherein said means for continuously adjusting the impedance of said filter comprises means for continuously adjusting the capacitance of said filter.

9. The apparatus of claim 5, wherein said filter comprises a plurality of continuously tunable linear phase filters.

10. The apparatus of claim 5, wherein said wideband receiver includes means for recovering a clock signal from the recovered data and for synchronizing said recovered data to said clock signal.

11. An apparatus for receiving data at different data rates from at least one transmission source, the data being received at an antenna, comprising:

means for receiving from said antenna a plurality of signals carrying said data, said plurality of signals having been modulated by a plurality of different modulators and transmitted at a plurality of said different data rates;

means for demodulating said plurality of received signals to provide baseband data;

means for filtering said plurality of demodulated signals;

means for continuously tuning said filtering means in response to said different data rates;

means for bit synchronizing said plurality of filtered signals to provide at least one of I-channel, Q-channel, and S-channel signals;

means for processing said at least one of I-channel, Q-channel, and S-channel signals for use by an end user;

wherein said means for continuously tuning comprises for each of said I and Q channels a first means for continuously tuning over a first tuning range, and a second means for continuously tuning over a second tuning range different from the first tuning range.

12. The apparatus of claim 11, wherein said means for continuously tuning said filtering means comprises:

means for acquiring at least one of a tabulated control voltage level and a calculated control voltage level in response to said different data rates;

means for providing a control voltage in response to said control voltage level; and means for continuously tuning the frequency response of said filtering means in response to said control voltage.

13. The apparatus of claim 12, wherein said means for continuously tuning the frequency response of said filtering means comprises means for continuously adjusting the impedance of said filtering means.

14. The apparatus of claim 13, wherein said means for continuously adjusting the impedance of said filtering means comprises means for continuously adjusting the capacitance of said filtering means.

15. A continuously tunable wideband receiver, comprising:

means for receiving signals having different data rates;

means for demodulating said received signals having different data rates into at least one of I-channel and Q-channel signals;

means for filtering said demodulated signals having said different data rates;

means for continuously tuning the frequency response of said filtering means in response to said different data rates;

means for recovering data and clock signals from said filtered signals having said different data rates; and means responsive to said means for demodulating for directing said demodulated signals having said different data rates to said first means for continuously tuning or to said second means of continuously tuning for each of said I and Q channels;

wherein said means for continuously tuning comprises for each of said I and Q channels a first means for continuously tuning over a first tuning range, and a second means for continuously tuning over a second tuning range different from the first tuning range.

* * * * *